United States Patent
Kurasawa

[15] 3,695,753
[45] Oct. 3, 1972

[54] MECHANISM FOR MOVING MOVIE PROJECTOR FILM INTERMITTENTLY IN NORMAL AND REVERSE DIRECTIONS

[72] Inventor: Makoto Kurasawa, Tokyo, Japan
[73] Assignee: Kabushiki Kaisha Ricoh, Tokyo, Japan
[22] Filed: Nov. 5, 1970
[21] Appl. No.: 87,275

[30] Foreign Application Priority Data
Nov. 20, 1969    Japan................44/110899

[52] U.S. Cl. ...............352/173, 352/191, 352/194
[51] Int. Cl. ...............................................G03b 1/22
[58] Field of Search..............352/173, 194, 195, 196; 226/64

[56] References Cited

UNITED STATES PATENTS

| | | |
|---|---|---|
| 3,471,227 | 10/1969 | McClellan et al......352/173 X |
| 3,556,649 | 1/1971 | Nupnau....................352/194 |
| 3,212,840 | 10/1965 | Roman et al. ............352/194 |
| 3,536,389 | 10/1970 | Reinsch et al. ........352/194 X |
| 3,580,668 | 5/1971 | Claar....................352/173 X |
| 3,583,801 | 6/1971 | Roth........................352/173 |
| 3,520,596 | 7/1970 | O'Donnell et al. ..........352/92 |
| 3,460,730 | 8/1969 | Krumbein....................226/64 |
| 3,402,006 | 9/1968 | Bundschuh et al. ...352/194 X |
| 3,537,629 | 11/1970 | Riedel....................352/196 X |
| 3,261,654 | 7/1966 | Faber et al................352/194 |

Primary Examiner—Samuel S. Matthews
Assistant Examiner—Alan A. Mathews
Attorney—McGlew and Toren

[57] ABSTRACT

A mechanism for moving film intermittently in normal and reverse directions, for a movie projector of the type having a film feed member operated by first and second cams, with the first cam reciprocating the feed member longitudinally of the film and the second cam reciprocating the feed member toward and away from the film, the two cams being driven by a shutter operating shaft, includes a follower interposed between the film feed member and the second cam. The direction in which the film is moved by the feed member can be switched between normal and reverse by shifting the follower on the surface of the second cam through an angle of at least 120° with respect to the axis of the cam. The angle through which the follower is shifted varies in dependence on the number of blades of the shutter of the projector.

3 Claims, 4 Drawing Figures

PATENTED OCT 3 1972 3,695,753
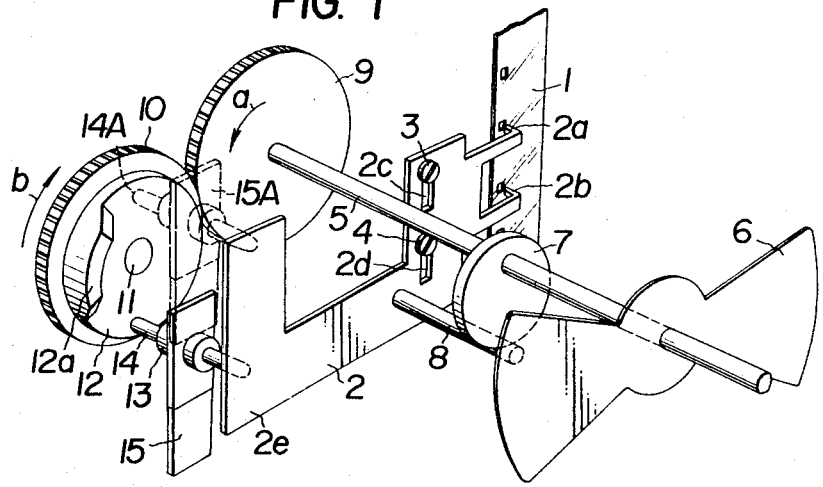
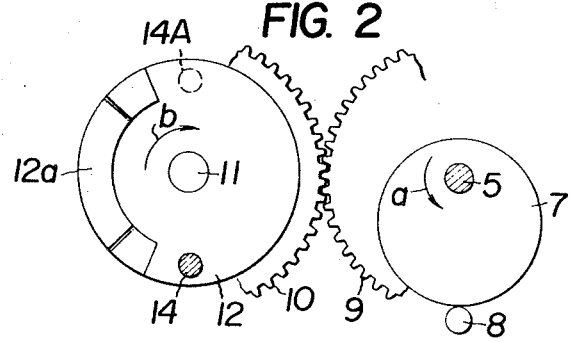
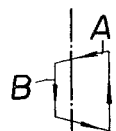 
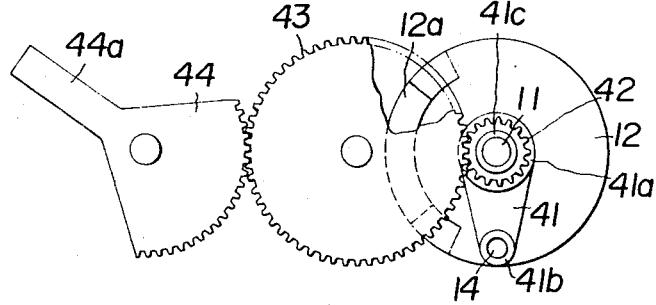
INVENTOR.
MAKOTO KURASAWA
BY McGlew and Toren
ATTORNEYS

MECHANISM FOR MOVING MOVIE PROJECTOR FILM INTERMITTENTLY IN NORMAL AND REVERSE DIRECTIONS

BACKGROUND OF THE INVENTION

When a film is screened or projected by moving the film in a reverse direction, in a movie projector, such as an 8 mm movie projector, for example, the film is moved intermittently in the reverse direction past the film gate. Heretofore, the usual manner of screening a film in the reverse direction has involved reversing the direction of rotation of a projector motor, or engaging or disengaging a reverse movement mechanism interposed between the motor and the shutter main or operating shaft.

The conventional devices known hitherto have disadvantages. For example, the provision of a reversible motor increases the cost of the projector, and the provision of a reverse movement mechanism not only increases the cost of a projector but also unduly complicates the construction of the projector, inevitably resulting in unstable operation of the projector.

SUMMARY OF THE INVENTION

This invention relates to movie projectors and, more particularly, to a novel and simplified mechanism for selectively reversing the direction of film movement without the use of a reversible motor or of a reverse mechanism interposed between a motor and a shutter operating shaft.

The invention has, for its objective, the provision, in a movie projector of the type in which a film feed member is operated by two cams, one of which reciprocates the feed member longitudinally of the film path and the other of which reciprocates the feed member toward and away from the film, with both cams being driven by a shutter operating shaft, of a mechanism for intermittently moving the film in either the normal or the reverse directions and which obviates the abovementioned disadvantages of the prior art. In accordance with the invention, this objective is attained by interposing, between the film feed member and the cam for moving the feed member toward and away from the film, a cam follower which is adapted to be shifted through a suitable angle on the cam surface of this cam with respect to the axis of rotation of the cam. Thereby, the film can be moved selectively intermittently in either normal direction or reverse direction.

In the mechanism embodying the invention, the film can be moved in either the normal or reverse direction while the shutter main shaft or operating shaft rotates continuously in one direction. Thereby, it is not necessary to use a reversible motor or to provide a reverse movement mechanism between the motor and the shutter operating shaft. Consequently, the invention is conducive to reduced cost and accurate operation of projectors. The two cams rotate in only one direction, so that the sound provided by film movement when the film is moved in the reverse direction remains the same as that provided when the film is moved in the normal direction. A projector embodying the invention is convenient to use because the projector can be operated readily by simple means, to effect reverse movement screening of the film. Furthermore, the mechanism of the present invention is so constructed that the parts are substantially free from wobble, and consequently it is not necessary to effect adjustments which are troublesome and time consuming.

While the direction of movement of the film could be reversed, in accordance with the invention, by moving the cam, for reciprocating the film feed member toward and away from the film, relative to the follower, there are technical difficulties with respect to moving the cam relative to its supporting shaft. Thus, the invention arrangement in which the follower is shifted relative to the cam, as described hereinafter, is preferable because of its freedom from such technical difficulties.

An object of the invention is to provide an improved film movement direction reversing means for movie projectors.

Another object of the invention is to provide such a reversing mechanism which is simple, effective, and not prone to malfunction.

A further object of the invention is to provide such a reversing mechanism in which a cam follower is interposed between a cam, for reciprocating a film feed member toward and away from the film, and the film feed member, and is adjustable angularly of the cam surface of the cam.

Another object of the invention is to provide such a mechanism in which shifting of the cam follower can be effected manually by simple trouble-free means.

For an understanding of the principles of the invention, reference is made to the following description of typical embodiments thereof as illustrated in the accompanying drawing.

BRIEF DESCRIPTION OF THE DRAWING

In the drawing:

FIG. 1 is a perspective view of mechanism, embodying the invention, for feeding film intermittently, in a movie projector, in either the normal direction or the reverse direction;

FIG. 2 is a front elevation view showing the relative positions, during operation, of a first cam for reciprocating a film feed member longitudinally of the path of travel of the film and a second cam for reciprocating the film feed member toward and away from the film, and forming parts of the mechanism shown in FIG. 1;

FIGS. 3A and 3B are schematic views illustrating the movements of the film advancing claw of the feed member of the mechanism shown in FIG. 1; and FIG. 4 is a front elevation view of another embodiment of mechanism for intermittently feeding a film in normal and reverse directions in a movie projector.

DESCRIPTION OF THE PREFERRED EMBODIMENTS

Referring first to the embodiment of the invention shown in FIGS. 1 and 2, a film 1 is illustrated as passing through a film gate of a movie projector, with the film being advanced by a film feed member 2 having, at one end thereof, claws 2a and 2b arranged to be engaged in the perforations of film 1 to advance the film. Feed member 2 is formed with slots 2c and 2d which are vertically elongated, as shown in FIG. 1, and which loosely receive headed pins 3 and 4, respectively, secured to a fixed part (not shown) of a projector. Film feed member 2 is supported, by pins 3 and 4, for vertical reciprocation longitudinally of the direction of film travel and for reciprocation toward and away from film 1.

A shutter main or operating shaft 5, disposed normal to the vertical plane including the surface of film 1, is positioned above film feed member 2. Shaft 5 mounts shutter blades 6, 6 for intermittently blocking the optical path of projected pictures, and also a cam 7 for reciprocating film feed member 2 vertically relative to film 1. For this purpose, a pin 8 secured on film feed member 2 is disposed below cam 7 and positioned against the peripheral surface thereof. Suitable means are provided to bias member 2 in a direction to press pin 8 against the periphery of cam 7, and shaft 5 is connected to the projector drive mechanism (not shown) by suitable means. Thus, if shutter operating shaft 5 rotates in the direction of the arrow a, film feed member 2 is reciprocated vertically, or longitudinally of film 1, by cam 7 in engagement with pin 8.

A gear 9 is secured to the front end of shaft 5, and meshes with a gear 10 mounted on a shaft 11 which supports a cam 12 for moving film feed member 2 forwardly and backwardly, or toward and away from film 1. Cam 12 is rotated in the direction of arrow b, or in a direction opposite to the direction of rotation of shutter main or operating shaft 5. That end of film feed member 2 opposite to the end having the claws 2a and 2b has a vertically oriented leg 2e which faces the cam surface of cam 12.

In accordance with the invention, a follower 14 is interposed between leg 2e and the cam surface of cam 12, and is slidably supported by a sleeve 13 so that it is perpendicular to the surface of leg 2e and the cam surface of cam 12. Sleeve 13 is fixedly secured to an operation member 15 which is mounted for sliding upwardly and downwardly as viewed in FIG. 1. Operation member 15 is adapted to shift follower 14 over the cam surface of cam 12, and to hold follower 14 positively in a position in which it rides on a protuberance 12a adjacent the peripheral margin of the cam surface of cam 12 and projecting axially of cam 12.

Suitable means are provided to cause film member 2 to press lightly against follower 14 so as to press follower 14, in turn, against the cam surface of cam 12. Accordingly, as cam 12 rotates, film feed member 2 is caused, by cam 12, through follower 14, to swing intermittently backwardly and forwardly, and thus toward and away from film 1. Shaft 11, supporting cam 12, is cut off so that its end is flush with the cam surface of cam 12.

In FIGS. 1 and 2, the cams 7 and 12 are shown in solid lines as in relative positions in which that end of follower 14 disposed on the cam surface of cam 12 is in the position in which it is shifted forwardly through 270° from the center of axial protrusion 12a when pin 8 is moved to its lowermost position by cam 7. When follower 14 is in this position, the movements of the film operating claws 2a and 2b of feed member 2 are as shown in FIG. 3A, in which a dash-and-dot line indicates the film path. Referring to FIG. 3A, the claws 2a and 2b, during their forward motion stroke A, engage in perforations in film 1, and advance the film downwardly during the succeeding downward motion stroke B. The film 1 is advanced by one frame during this pull-down stroke, and screened during the remaining two strokes of the claws 2a and 2b. Thus, following the downward movement stroke B, claws 2a and 2b are retracted and disengaged from the perforations in film 1, and are then moved upwardly to complete the cycle of movement.

If operation member 15 is operated, from outside the projector, and moved to the broken line position 15A shown in FIG. 1, with cam 7, for reciprocating feed member 2 longitudinally of film 1, and pin 8 remaining in the positions shown in FIGS. 1 and 2, follower 14 will be shifted to the broken line position 14A shown in FIGS. 1 and 2. This broken line position is diametrically opposite the original position of follower 14, or shifted through 180° from such original position with respect to the axis of cam 12. When follower 14 is in the position 14A, the forward and backward strokes of claws 2a and 2b are retarded by 180° with respect to their up and down strokes so that the movements of claws 2a and 2b are as shown in FIG. 3B. Thus, in FIG. 3B, the directions of movements during one cycle are reversed from the directions of movements shown in FIG. 3A. When this is the case, the film 1 is moved in the reverse direction during the upward stroke D of claws 2a and 2b which are engaged in the film perforations in the preceding forward stroke C, thereby resulting in screening of film 1 while the film is moved in the reverse direction.

FIG. 4 illustrates another operating means for shifting follower 14 over the cam surface of cam 12. In this embodiment of the invention, a sleeve 41a of a support 41 for follower 14 is loosely fitted over the shaft 11 mounting cam 12, and a sleeve 41b at the outer end of support 41 loosely receives follower 14. Sleeve or bushing 41a has a minor diameter portion 41c to which is secured a pinion 42 meshing with the gear 43 which, in turn, meshes with a segmental gear 44. Gear 44 is provided with an operation handle 44a which can be operated from outside the projector for swinging segmental gear 44 to rotate support 41 through the medium of gears 43 and 42.

Such rotation responsive to movement of operation handle 44a causes follower 14 to move, on the cam surface of cam 12, about shaft 11, thus permitting the follower 14 to be positioned at any location as desired on the cam surface of cam 12. Suitable means, such as click stop means, may be provided for terminating movement of operation handle 44a and locking the same in position, in order that follower 14 may be held in place in any predetermined position on the cam surface of cam 12.

In the embodiment of FIG. 4, the direction of movement of the film can be reversed when follower 14 is shifted over the cam surface of cam 12 through 180°, with respect to the axis of the cam, because the shutter has only two blades. It will be clear that, if the shutter has four blades, then the movement of the film also can be reversed by shifting the follower 14 through 180°, and that, if the shutter has three blades, the direction of movement of the film can be reversed by shifting follower 14 through either 120° or 240°.

While specific embodiments of the invention have been shown and described in detail to illustrate the application of the principles of the invention, it will be understood that the invention may be embodied otherwise without departing from such principles.

what is claimed is:

1. In a movie projector including a shutter, a shutter operating shaft, a film feed member having claws engageable in perforations in the film, a first cam for reciprocating the feed member longitudinally of the film, and a second cam for reciprocating the feed member toward and away from the film to engage and disengage, respectively, the claws relative to the film perforations, with both cams being driven from the shutter operating shaft: the improvement comprising, in combination, a cam follower interposed between said film feed member and said second cam; means selectively operable to effect relative shifting between the cam surface of said second cam and said follower between cam surface-follower contact positions spaced angularly apart by at least 120°, to vary the reciprocations of said film feed member toward and away from the film, in phase, through at least 120°; whereby the direction of film movement may be switched between normal and reverse directions responsive to such shifting; said means mounting said cam follower and selectively operable to shift the latter over the cam surface of said second cam; an externally accessible operating member connected to said mounting means; said second cam being a circular cam and said cam surface being an arcuate axial protrusion of limited angular extent adjacent the peripheral margin of said second cam; a second shaft mounting said second cam and rotatable from said operating shaft; said second shaft projecting axially outwardly of that surface of said second cam engaged by said cam follower; said means mounting said cam follower comprising a radial arm rotatable about said second shaft independently of said second cam, and having a sleeve at its outer end mounting said cam follower for movement axially of said sleeve; and a gear secured to said arm coaxially with said second shaft; said operating member comprising gear means meshing with said gear.

2. In a movie projector, the improvement claimed in claim 1, in which said gear means comprises a segmental gear oscillatable to rotate said first-mentioned gear and having an operating handle.

3. In a movie projector, the improvement claimed in claim 1, in which said gear is a pinion; said gear means comprising a spur gear meshing with said pinion; said operating member comprising a segmental gear meshing with said spur gear and having an operating handle.

* * * * *